United States Patent

Parsons

[11] Patent Number: 5,592,856
[45] Date of Patent: Jan. 14, 1997

[54] SELF-CENTERING SHIFTER ASSEMBLY

[75] Inventor: George A. Parsons, Grosse Pointe, Mich.

[73] Assignee: New Venture Gear, Inc., Troy, Mich.

[21] Appl. No.: 389,015

[22] Filed: Feb. 15, 1995

[51] Int. Cl.$^6$ .............................. F16C 11/06; F16H 59/04; G05G 9/00
[52] U.S. Cl. ................ 74/473 P; 74/473 R; 267/150; 267/158
[58] Field of Search .................... 74/473 P, 473 R, 74/471 XY; 267/148, 150, 158, 159, 36.1

[56]       References Cited

U.S. PATENT DOCUMENTS

| | | | |
|---|---|---|---|
| 2,100,642 | 11/1937 | Geyer | 74/473 P |
| 2,853,895 | 9/1958 | Bixby | 74/473 R |
| 3,264,893 | 8/1966 | Stott et al. | 74/477 |
| 3,269,208 | 8/1966 | Whitchurch | 74/473 R |
| 3,483,888 | 12/1969 | Wurzel | 137/539 |
| 3,780,596 | 12/1973 | Takahashi et al. | 74/473 P |
| 3,811,018 | 5/1974 | Kaplan | 74/471 X Y |
| 3,968,958 | 7/1976 | Huchette et al. | 267/149 X |
| 4,269,081 | 5/1981 | Peterson et al. | 74/473 R |
| 4,333,360 | 6/1982 | Simmons | 74/473 P |
| 4,355,543 | 10/1982 | Ikemoto et al. | 74/473 P |
| 4,515,032 | 5/1985 | Olmsted | 74/473 R |
| 4,543,842 | 10/1985 | Katayama | 74/473 P |
| 4,544,610 | 10/1985 | Okamoto et al. | 267/149 X |
| 4,569,245 | 2/1986 | Feldt et al. | 74/473 P |
| 4,576,059 | 3/1986 | Nishu et al. | 74/473 P |
| 4,581,951 | 4/1986 | Watson | 74/473 R |
| 4,784,008 | 11/1988 | Paquereau et al. | 74/471 X Y |
| 4,802,659 | 2/1989 | Hope | 267/149 |
| 5,289,734 | 3/1901 | Parsons | 74/476 |
| 5,313,853 | 5/1994 | Olmsted et al. | 74/473 R |
| 5,349,881 | 9/1994 | Olorenshaw et al. | 74/471 X Y |

FOREIGN PATENT DOCUMENTS 504003 9/1992 European Pat. Off. ............... 267/150

*Primary Examiner*—Rodney H. Bonck
*Assistant Examiner*—Troy Grabow

[57]       ABSTRACT

A spring biased shifter assembly is disclosed for use with a manually operated multi-speed transmission. The shifter assembly includes a shift tower to which a shift lever of a shift mechanism is pivotally mounted. A pair of spaced apart single leaf flat springs continuously downwardly bias a portion of the shift mechanism, thereby biasing the shift lever to a neutral position. The springs are located within slots defined by the shift tower and are further held in place by a cover that is fastened to the shift tower. The particular configuration of the single leaf flat springs provides improved shifter feel, substantially eliminates play in the shifter assembly, and automatically self-centers the shift lever to a neutral position while maintaining a constant downward biasing force thereon. The single leaf flat springs are preferably constructed of a fiber reinforced composite material, thereby providing excellent noise attenuation properties.

20 Claims, 2 Drawing Sheets

SELF-CENTERING SHIFTER ASSEMBLY

BACKGROUND OF THE INVENTION

The present invention relates generally to a gearshift mechanism for use with a vehicle transmission. More particularly, the present invention relates to a spring biased self-centering shifter assembly for use with a multi-speed manual transmission of a vehicle for shifting the manual transmission between a plurality of ratio gear positions.

As is known, manual transmissions are conventionally equipped with a shifter assembly for permitting a vehicle operator to selectively shift between various forward ratio gears and a reverse gear. The shifter assembly generally includes a tower housing secured to an exterior surface of the transmission casing. A shift lever is pivotally mounted to the tower housing and operably coupled to a gearshift mechanism located within the transmission casing.

One type of shifter assembly well known in the art is referred to as a "drop-in" type shifter. Drop-in type shifters normally include a shift mechanism formed to include a fulcrum ball which is pivotally received with a socket formed in a base. The shift lever extends from the bottom of the base into the transmission for changing the drive ratio of the transmission in response to operator control of the shift lever. The base is positioned over an aperture in the transmission housing and secured to the top of a transmission with bolts.

A longstanding problem associated with conventional shifter assemblies, including drop-in type shifters, is the propagation of vibration from the power transfer unit of a vehicle to the shift lever. Many attempts have been previously made to eliminate such vibration and the undesirable noise generated therefrom. For example, is it known to incorporate a vibrational dampening bushing between the lower end of the shift lever and its interconnection to an associated gearshift mechanism. A similar manner of vibrational dampening is disclosed in U.S. Pat. No. 3,780,596 to Takahashi et al., where a resilient material is incorporated between the fulcrum ball and its support surface. In these arrangements, however, the quality of operator feel upon selective shifting on the shift lever is often sacrificed.

It is also known to reduce the propagation of undesirable vibrations to a shift lever by continuously biasing the shift lever into a neutral position or neutral plane. For example, U.S. Pat. Nos. 4,333,360 and 4,581,951 disclose arrangements in which the shift lever is biased by a pair of helical compression springs. U.S. Pat. No. 2,853,895 to Bixby discloses a transmission shift lever biased by arcuate spring segments vertically mounted at opposite ends of a pin. U.S. Pat. No. 4,569,245 to Feldt et al. discloses a shifter arrangement incorporating a single flat washer-like spring for biasing a shift lever.

The prior art attempts to utilize spring biasing characteristics to mitigate propagation of power train vibrations involve disadvantages primarily related to the expense of manufacture. In addition thereto, not only are the components relatively expensive, assembly techniques have proven to be both difficult and time consuming. In some of the prior devices, preloading of the biasing mechanism is required prior to installation. In other prior devices, the location of the biasing mechanism prevents the shifter assembly from being quickly and easily "dropped" into connection with an associated gearshift mechanism. Many prior art devices include numerous metal components which are known to readily transmit noise and vibrations.

While conventional shift assemblies have proven to be commercially acceptable, each is associated with disadvantages and/or inherent limitations, some of which have been discussed above. Accordingly, a need exists for an improved shifter assembly which is less costly to produce, reduces the number of components to manufacture and assemble, reduces noise and vibrations, has an improved operator feel, yet is reliable and easy to manufacture and assemble.

SUMMARY OF THE INVENTION

The present invention is directed towards overcoming disadvantages commonly associated with conventional shifter assemblies, including but not limited to those discussed above, by providing an improved shifter assembly of the type operably coupled to a gearshift mechanism associated with a multi-speed manual transmission for shifting the manual transmission between a plurality of ratio gear positions. In accordance with the present invention, the preferred embodiment of a shifter assembly for shifting a manual transmission between a plurality of ratio gear positions comprises a shift mechanism having an elongated shift lever. The elongated shift lever includes a first end coupled to a transmission gearshift mechanism and a second end under the control of a vehicle operator for causing movement of the gearshift mechanism among the plurality of ratio gear positions in response to selective pivotal movement of the shift lever. The shifter assembly further includes a shift tower attached to a housing of the transmission for operatively mounting the shift lever with respect to the housing. Additionally, the shifter assembly preferably includes a pair of single leaf flat springs arranged to constantly bias the shift lever into a neutral position. In a preferred embodiment, a spherical fulcrum ball is disposed on the shift lever which is received in a socket defined by the shift tower for pivotal mounting with respect thereto. Further in the preferred embodiment, a rocking shaft having first and second ends is disposed on the fulcrum ball for stabilizing the shift lever for pivotal movement. In one application, the single leaf flat springs are constructed from a fiber reinforced composite material and directly bias the first and second ends of the rocking shaft.

Therefore, the present invention allows for improved shift lever operation and operator feel while being used with a conventional manual transmission.

A related object of the present invention is to provide a shifter assembly that is biased by a pair of single leaf flat springs which are constructed from a fiber reinforced composite material, thereby further reducing undesirable noise and vibrations.

Another object of the present invention is to provide a shifter assembly which offers a shifter mechanism having a smooth spring back feel with a quicker response to the operator.

A further object of the present invention is to provide a reliable, simplified, inexpensive shifter assembly having a minimal number of basic components.

Still yet another object of the present invention is to provide a shifter assembly having an integrally formed shifter tower and transmission cover assembly.

BRIEF DESCRIPTION OF THE DRAWINGS

Further objects, features and advantages of the present invention will become apparent from analysis of the following written specification and the accompanying drawing and the appended claims in which:

DETAILED DESCRIPTION OF THE PREFERRED EMBODIMENTS

Figure 1:
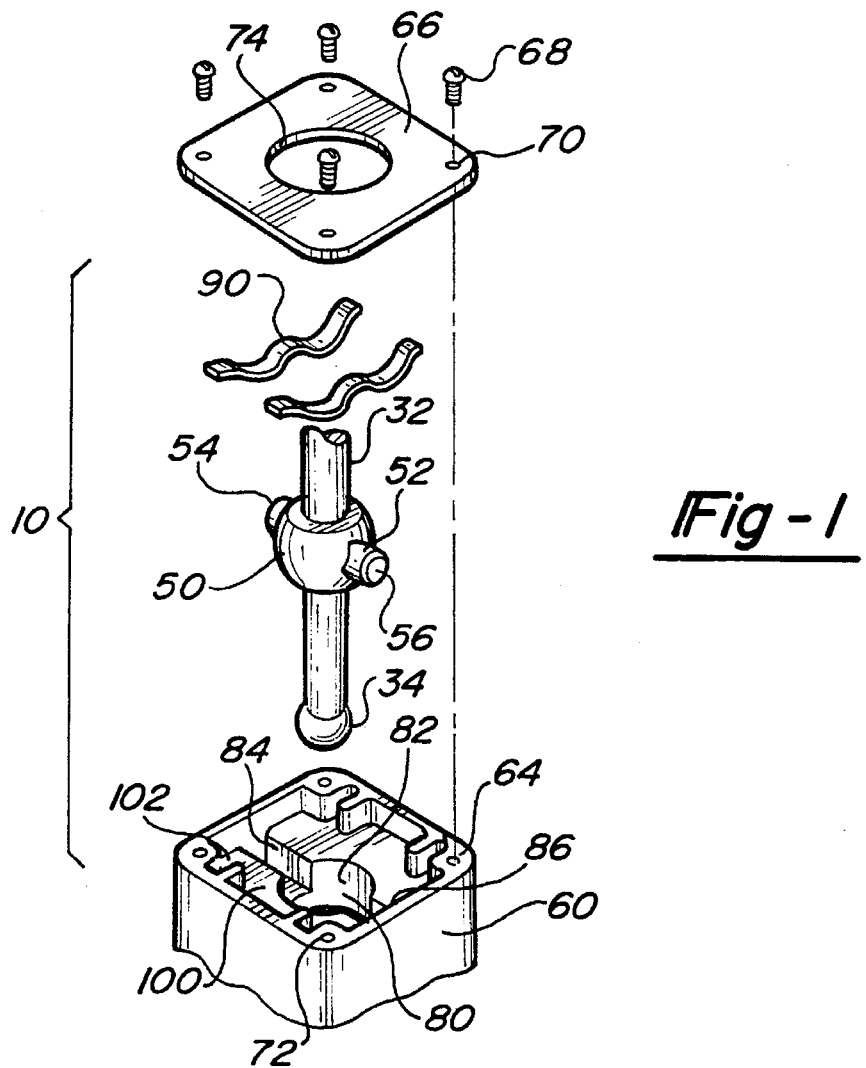
FIG. 1 is an exploded perspective view of a shifter assembly constructed in accordance with the teaching of a preferred embodiment of the present invention.

In general, the present invention is directed to a shifter assembly of the type operably coupled to a conventional gearshift mechanism for permitting a vehicle operator to selectively shift between a plurality of ratio gear positions of a multi-speed manual transmission. Certain terminology is used in the following description for convenience only and is not intended to be limiting. For example, words such as "upper", "downward" and "clockwise" designate directions in the drawings to which reference is being made.

Turning to drawings, where like reference numerals have been used to designate like elements throughout, there is shown generally a shifter assembly 10 adapted for use in an automotive vehicle or the like. By way of example, it may be assumed for purposes of illustration that shifter assembly 10 is adapted to cooperate with a transmission 12 (partially shown in FIG. 3) which provides forward speed ratios and a reverse speed ratio. As is conventional, and therefore not illustrated in detail, in such a transmission 12, there are input and output shafts as well as a plurality of gear ratios which may be selectively engaged to establish a plurality of speed ratios for the transfer of torque between the input and output shafts.

Within a suitable transmission housing 14, there is, for example, a gearshift mechanism including a single shift rail 16 supported for rotation on and sliding movement along its longitudinal axis A. A crank arm 18 or the like is secured to rail 14 for rotational and longitudinal movement therewith. As will be appreciated by those skilled in the art, crank arm 18 defines a bore 20. Rotation of shift rail 16 selects appropriate speed ratios and longitudinal sliding movement thereof engages a selected ratio. As will be further appreciated by those skilled in the art, the shifter assembly can alternatively cooperate with a gearshift mechanism of the type including a plurality of movable lugs for selectively shifting between the plurality of speed ratios. In this regard, it will be understood that the particular arrangement shown throughout the drawings is merely exemplary.

Reference may be had to commonly assigned U.S. Pat. No. 4,677,868 which discloses a suitable manual transmission for use with the present invention, the disclosure of which is expressly incorporated herein by reference. Since the novel features of the present invention are not directed to the particular construction of any specific manual transmission, it is not believed that further description thereof is necessary.

Figure 2:
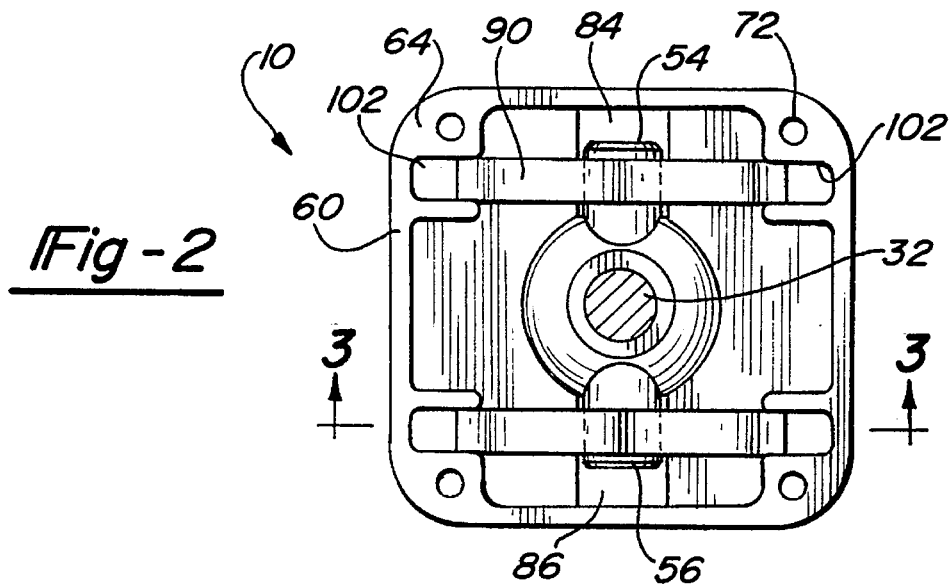
FIG. 2 is a top view of the shifter assembly of FIG. 1, the cover shown in FIG. 1 removed to clearly illustrate the shift mechanism and the pair of single leaf flat springs in relationship to the shift tower.
Figure 3:
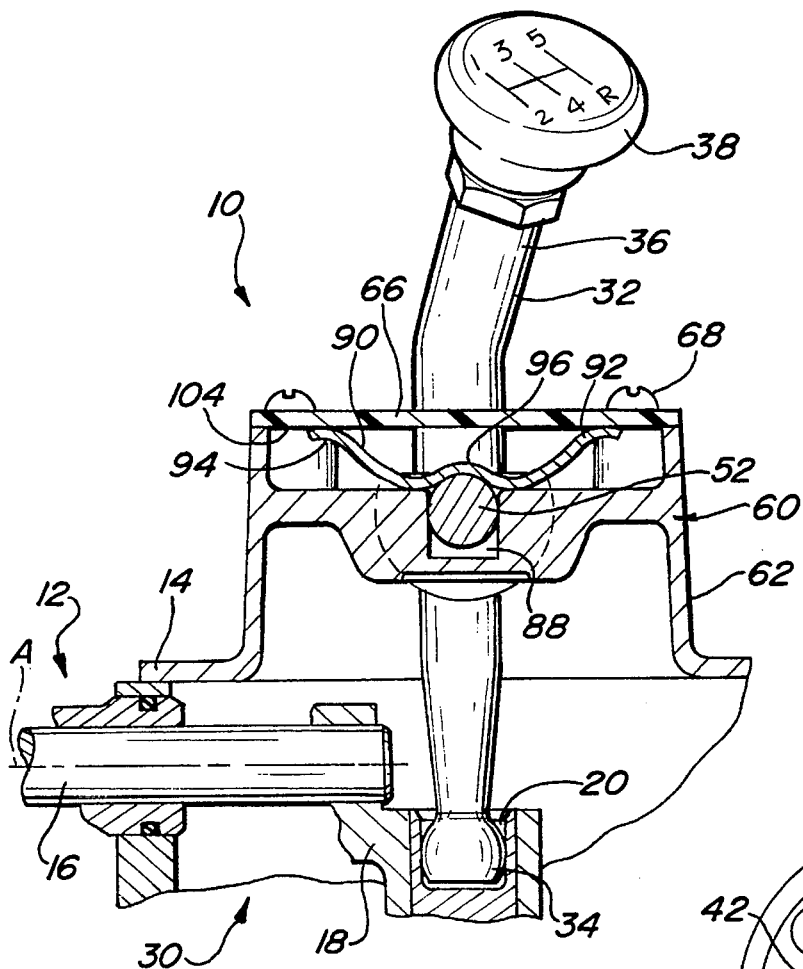
FIG. 3 is partial cross-sectional view of the present invention taken through the line 3—3 of FIG. 2.

With particular reference to FIGS. 1 through 3, a shifter assembly 10 constructed in accordance with the teachings of a preferred embodiment of the present invention will now be described in detail. Shifter assembly 10 is shown to include a shift mechanism 30 including an elongated shift lever 32. Elongated shift lever 32 has a first end 34 adapted to be received into bore 20 of the gearshift mechanism of transmission 12. Elongated shift lever 32 further includes a second end 36 on which a shifter knob 38 is mounted. Shifter knob 38 is controllable by a vehicle operator for causing movement of the gearshift mechanism among the various ratio gear positions in response to selective pivotal movement of shift lever 32.

Figure 4:
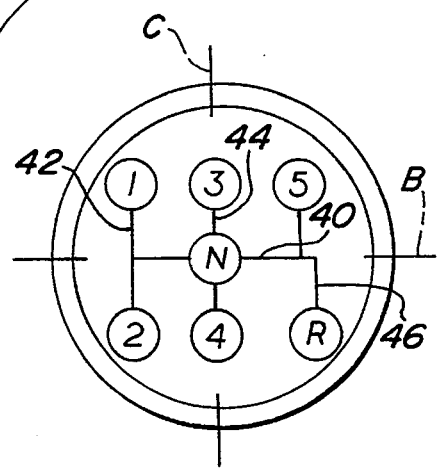
FIG. 4 is a schematic representation of the pivotal movements of the shift lever and how the pivotal movements produce changes in the drive ratio of a manual automotive transmission having a conventional H-shaped pattern.

As shown schematically in FIG. 4, the shifter assembly 10 of the present invention is specifically adapted to cooperate with a manual transmission 12 having a conventional H-shaped shift pattern. As is known, the shift pattern includes a neutral cross-over path 40 which defines a first orthogonal axis B. In the exemplary shift pattern diagrammatically illustrated, three linear shift planes are provided along the neutral cross-over path. A first linear shift plane 42 is provided at one end between the two lowest gears (e.g., first and second). A second linear shift plane 44 is centrally located along neutral cross-over path 40 between second and third gears. An upright, neutral position N of shift lever 32 is located at the intersection of second shift plane 44 and neutral cross-over path 40. For purposes of the remaining detailed description, second shift plane 44 defines a second orthogonal axis C substantially perpendicular to the first orthogonal axis B about which shift lever 32 is permitted to pivot. A third linear shift plane 46 is provided at a second end of neutral cross-over path 40 between the highest forward gear ratio (e.g., fifth gear) and the reverse gear ratio. While an exemplary shift pattern is shown and described, it will be appreciated by those skilled in the art that the shift assembly 10 of the present invention can be utilized with other conventional shift patterns.

In the preferred embodiment, shift mechanism 30 further includes a partially spherical fulcrum ball 50 disposed centrally on elongated shift lever 32 and a rocking shaft 52 disposed on fulcrum ball 50. Rocking shaft 52 includes first and second ends 54, 56 and is oriented substantially perpendicular to an axis defined by elongated shift lever 32.

To provide mounting means for operatively mounting shift mechanism with respect to housing 14 of transmission 12, the shifter assembly 10 of the present invention further includes a shift tower 60. Shift tower 60 includes an external surface 62 having a generally rectangular horizontal cross-section. In the preferred embodiment, external surface 62 tapers slightly in an upward direction. Further, in the preferred embodiment, exterior surface 62 is integrally formed with housing 14 of transmission 12.

Shift tower 60 further includes an upper peripheral surface 64 to which a cover 66 is releasably attached. In the exemplary embodiment illustrated throughout the drawings, the cover 66 is releasably fastened to shift tower 60 by a plurality of screws 68 which pass through apertures 70 formed in cover 66 and engage threaded bores 72 located in upper peripheral surface 64. It will be appreciated by those skilled in the art that cover 66 can be alternatively attached to shift tower 60 in any suitable manner well-known in the art. Cover 66 is further formed to include a central aperture 74 through which second end 36 of elongated shift lever 32 is permitted to pass.

To cooperatively receive shift mechanism 30, shift tower 60 defines an upwardly opening seat or socket 80 with an inner surface 82, preferably of partial spherical configuration. Socket 80 is sized to pivotally receive fulcrum ball 50. Shift tower 60 further partially defines first and second horizontally extending channels 84, 86 adapted to receive first and second ends 54, 56 of rocking shaft 52. A vertical aperture (not shown) extends through the center of shift tower 60 through which shift lever 32 is permitted to pass.

When fulcrum ball 50 is received in socket 80 and shift lever 32 is in an upright, neutral position (as shown in FIG. 3 and diagrammatically represented by N in FIG. 4), rocking shaft 52 is horizontally disposed with first and second ends 54, 56 located substantially within first and second channels, respectively. Minimal clearances are provided between rocking shaft 52 and a pair of spaced apart sidewalls of first and second channels 84, 86. As a result, rotation of fulcrum ball 50 in a horizontal plane is substantially prohibited. With each channel 84, 86, a space 88 is provided between rocking shaft 52 and a bottom surface. As will be appreciated more fully below, space 88 permits rocking shaft 52 to pivot about a second orthogonal axis C (shown in FIG. 4) for cross-over selection of the various speed ratios.

In one application, the integrally formed shift tower 60 and housing 14 are made by compression molding. In a preferred embodiment, the integrally formed shift tower and housing 14 are made of a composite material of the type including a glass fiber, reinforced polymer matrix. However, it will be appreciated by those skilled in the art that shift tower 60 and housing 14 can alternatively be constructed of metal or any other suitable material.

To provide biasing means for biasing elongated shift lever 32 into neutral position N, shifter assembly 10 of the present invention further includes a pair of single leaf flat springs 90. In the preferred embodiment, each of the single leaf flat springs 90 is constructed from a fiber reinforced composite material to include first and second curvilinear portions 92, 94 interdisposed by an arcuate central portion 96. From a perspective of a side elevational view (as shown in FIG. 3), each single leaf flat spring 90 has an elongated, relatively thin, bow-shaped configuration which is a characteristic of its resilience. Each single leaf flat spring 90 is supported by an upper, interior surface 100 of shift tower 60 and restrained laterally and longitudinally from movement by a pair of spaced apart parallel extending spring slots 102. When shifter assembly 10 is assembled, each of the single leaf flat springs 90 is loaded and retained by cover 66 (as shown in FIG. 3).

As shown in FIG. 3, first and second curvilinear portions 92, 94 of each single leaf flat spring 90 is in constant engagement with an underside 104 of cover 66. Central arcuate portions 96 of springs 90 cooperate to define a central recess for matingly receiving rocking shaft 52 and directly downwardly biasing rocking shaft 52. When elongated shift lever 32 is normally biased to its neutral position N, two point contact is maintained between upper interior surface 90 of shift tower 60 and each single leaf flat springs 90.

The curvature of the arcuate segment 96 provides for rolling contact between rocking shaft 52 and each single leaf flat spring 90. Each spring slot 102 is configured to substantially prohibit lateral movement of the respective single leaf flat spring 92. However, negligible lateral shifting of springs 90 within the respective slots 102 may be experienced as a result of necessary clearances. The limited free movement of single leaf flat springs 90 within respective spring slots 102 assists in smooth operation of shifter assembly 10. Furthermore, the limited lateral shifting of single leaf flat springs 90 with respective spring slots 102 facilitates self-centering the elongated shift lever 32 to its neutral position N.

One of the more significant advantages associated with the biasing arrangement of the present invention is that it offers a self-centering characteristic that provides for quick response to the operator. This is partially accomplished by allowing rocking shaft 52 to be positioned within channels 84, 86 and to be continually biased by central arcuate segments 96. The resulting shifter assembly 10 continuously and directly biases the rocking shaft 52, thereby self-centering the elongated shift lever 32 to a home or neutral position N and minimizes vibrations of elongated shift lever 32 and commonly associated noises.

The ease of assembly of shifter assembly 10 lends itself to a high-volume production setting. Specifically, elongated shift lever 32 can quickly and easily be dropped into shift tower 60 such that fulcrum ball 50 is received in socket 80 and rocking shaft 52 rests within channels 84, 86. Next, the pair of single leaf flat springs 90 are positioned within spring slots 102 and retained by fastening of housing cover 66 to shift tower 60. In contradistinction to assembly of many prior known constructions, preloading single leaf flat springs 90 is not required. Single leaf flat springs 90 are now compressed, thus causing a downward biasing force upon elongated shift lever 32.

It will be appreciated that the shift tower 60, single leaf flat springs 90 and housing cover 66 may be made of various types of materials, including metal. However, it is preferred that they be made of a composite material as previously referred to herein. It has been found that composites offer excellent noise attenuation characteristics which is desirable in automotive applications. Moreover, by manufacturing shift tower 60 by a compression molding process, minimal finishing steps are required in order to assemble the shift assembly 10. Further, composite springs offer an advantage of having enhanced long-term resilient capabilities which out perform conventional spring steel type springs. Alternatively though, steel springs may be used and do offer their own advantages, including high-volume production. Likewise, shift tower 60 and/or the integral shift tower 60 and housing 14 may be made by conventional casting methods.

In order to ensure a thorough understanding of the present invention, the operation of the shifter assembly 10 detailed heretofore will now be described. Elongated shift lever 32 constantly is biased to neutral position N within neutral cross-over plane 40, as illustrated diagrammatically in FIG. 4. With elongated shift lever 32 in this neutral position N, shift rail 16 is oriented so as to select one of the third and fourth forward speed ratios.

For crossover selection of other speed ratios, elongated shift lever 32 is pivoted in a lateral plane about second orthogonal axis C which intersects and is perpendicular to first orthogonal axis B. Pivotal movement of second end 36 of elongated shift lever 32 counterclockwise (as generally shown in FIG. 3) about second orthogonal axis C serves to translate shift rail 16 to the first shift plane 42. Similarly, pivotal movement of elongated shift lever 32 clockwise (as generally shown in FIG. 3) would translate rotate shift rail 16 to the third shift plane 46 to select either the reverse speed ratio or fifth forward illustrated in FIG. 4.

As elongated shift lever 32 is pivoted laterally about second orthogonal axis C, rocking shaft 52 disengages from one single leaf flat spring 90 and lifts the other single leaf flat spring 90 off of inner upper surface 100 of shift tower 60, thereby causing compression thereof and increased resistance thereto. The curvature of central arcuate segment 96 provides for rolling contact between rocking shaft 52 and single leaf flat spring 90. After a crossover selection, elongated shift lever is pivoted in a longitudinal plane about first orthogonal axis B so as to rotate shift rail 16 about axis A (as shown in FIG. 3), thereby engaging one of the selective speed ratios.

Thus, it will be seen that the arrangement of biasing disclosed herein preloads the elongated shift lever 32 so as to establish upright, neutral position N in neutral cross-over shift plane. Further, the pair of single leaf flat springs 90 load fulcrum ball 50 into its socket 80, even when a force is applied to elongated shift lever 32 for crossover selection.

Figure 5:
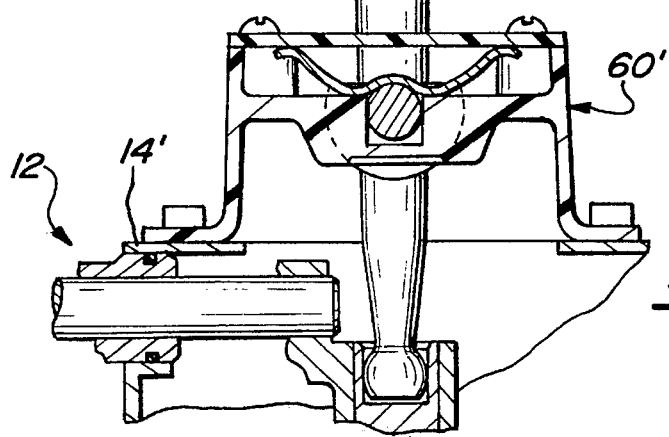
FIG. 5 is a partial cross-sectional view similar to FIG. 3, illustrating a shifter assembly constructed in accordance with the teachings of an alternative embodiment of the present invention.

Referring now to FIG. 5, a shifter assembly 10' constructed in accordance with an alternative embodiment of the present invention is illustrated. In the alternative embodiment, shift tower 60' is preferably constructed as a separate component from transmission cover or casing 14'. Thus, conventional methods may be employed to fasten shift tower 60' to transmission cover 14'. The remaining elements of the alternative embodiment 10' are identical to corresponding elements of the preferred embodiment 10 and need not be again described in detail.

It should be understood that while the preferred and alternative embodiments of the present invention which have been shown and described are to be considered illustrative and may be modified by those skilled in the art. In this regard, the foregoing discussion discloses and describes merely exemplary embodiments of the present invention. One skilled in the art will readily recognize from such discussion and from the accompany drawings and claims, that various changes, modification and variations can be made therein without department from the spirit and scope of the invention as defined in the following claims.

What is claimed is:

1. A shifter assembly of the type operably coupled to a gearshift mechanism associated with a multi-speed manual transmission for permitting a vehicle operator to selectively shift the transmission between a plurality of ratio gear positions thereof, the shifter assembly comprising:
   a shift mechanism including an elongated shift lever, said elongated shift lever having a first end coupled to the gearshift mechanism and a second end under the control of a vehicle operator for causing movement of the gearshift mechanism among the plurality of ratio gear positions in response to selective pivotal movement of said shift lever and said shift mechanism including a rocking shaft having first and second ends;
   mounting means for operatively mounting said shift mechanism with respect to a housing of the transmission; and
   first and second single leaf flat springs biasing said shift mechanism into a neutral position, said first single leaf flat spring biasing said first end of said rocking shaft and said second single leaf flat spring biasing said second end of said rocking shaft such that said first and second single leaf flat springs are on opposing sides of said shift lever and said first and second single leaf flat springs including an arcuate segment associated with said first and second end such that said first and second ends are matingly received in said arcuate segments.

2. The shifter assembly of claim 1, wherein said first single leaf flat spring biases said first end in a downward direction, and said second single leaf flat spring biases said second end in said downward direction.

3. The shifter assembly of claim 2, wherein said first and second single leaf flat springs directly bias said first and second ends of said rocking shaft, respectively.

4. The shifter assembly of claim 2, wherein each of said first and second single leaf flat springs are constructed from a fiber reinforced composite material.

5. The shifter assembly of claim 4, wherein said mounting means is a shifter tower integrally formed with said housing of the transmission.

6. The shifter assembly of claim 2, wherein said mounting means defines a portion of a spherically configured socket and further wherein said shift mechanism includes a substantially spherical fulcrum ball disposed on said elongated shift lever, said fulcrum ball being received in said socket for pivotal mounting with respect thereto, said first and second ends of said rocking shaft disposed on said fulcrum ball for stabilizing said shift lever for pivotal movement about a first orthogonal axis defined by said rocking shaft on a second orthogonal axis normal thereto.

7. The shifter assembly of claim 6, wherein said mounting means comprises a shift tower and further wherein said shift tower includes first and second pairs of spring receiving portions, each spring receiving portion adapted to laterally and longitudinally restrain movement of one of said first and second single leaf flat springs.

8. The shifter assembly of claim 1, wherein each of said first and second single leaf flat springs define a central recess biasingly receiving a portion of said shift mechanism.

9. The shifter assembly of claim 8, wherein said arcuate segments cooperating to define said central recess.

10. The shifter assembly of claim 9, wherein each of said first and second single leaf flat springs further include a pair of curvilinear segments interdisposed by said arcuate segment.

11. The shifter assembly of claim 9, further comprising a cover attached to said shifter tower, said cover compressing each of said first and second single leaf flat springs into a loaded condition.

12. A shifter assembly of the type operably coupled to a gearshift mechanism associated with a multi-speed manual transmission for permitting a vehicle operator to selectively shift between a plurality of ratio gear positions of the transmission, the shifter assembly comprising:
   a shift mechanism including an elongated shift lever, said elongated shift lever having a first end coupled to the gearshift mechanism and a second end under the control of a vehicle operator for causing movement of the gearshift mechanism among said plurality of ratio gear positions in response to selective pivotal movement of said shift lever and said shift mechanism including a rocking shaft having first and second ends; and
   a pair of single leaf flat springs biasing said shift mechanism into a neutral position, said first single leaf flat spring biasing said first end of said rocking shaft and said second single leaf flat spring biasing said second end of said rocking shaft such that said first and second single leaf flat springs are on opposing sides of said shift lever and said first and second single leaf flat springs including an arcuate segment associated with said first and second end such that said first and second ends are matingly received in said arcuate segments.

13. The shifter assembly of claim 12, further comprising a shift tower interconnected with a housing of the transmission, said shift tower adapted for operatively mounting said shift lever with respect to said housing of the transmission.

14. The shifter assembly of claim 13, wherein said shift tower defines a substantially spherical socket, and further wherein said shift mechanism includes a substantially spherical fulcrum ball disposed on said elongated shift lever, said fulcrum ball being received in said socket for pivotal mounting with respect thereto, said shift mechanism further including a rocking shaft having first and second ends disposed on said fulcrum ball for stabilizing said shift lever for pivotal movement about a first orthogonal axis defined by said rocking shaft and a second orthogonal axis normal thereto.

15. The shifter assembly of claim 14, wherein each single leaf flat spring is constructed from a fiber reinforced composite material.

16. The shifter assembly of claim 14, further comprising a cover mounted to said shift tower, said cover compressing said pair of single leaf flat springs downwardly such that two point contact is establish between each of said pair of single leaf flat springs and said shift tower when said elongated shift lever is in said neutral position.

17. The shifter assembly of claim 13, wherein said shift tower includes an external surface integral formed with said housing of the transmission.

18. A shifter assembly of the type operably coupled to a gearshift mechanism associated with a multi-speed manual transmission for permitting a vehicle operator to selectively shift between a plurality of ratio gear positions of the transmission, the shifter assembly comprising:

a shift mechanism including an elongated shift lever, said elongated shift lever having a first end coupled to the gearshift mechanism and a second end under the control of a vehicle operator for causing movement of the gearshift mechanism among the plurality of ratio gear positions in response to selective pivotal movement of said shift lever, said shift mechanism further including a substantially spherical fulcrum ball disposed on said elongated shift lever, and a rocking shaft having first and second ends disposed on said fulcrum ball for stabilizing said shift lever for pivotal movement about first and second orthagonal axes of an H-shaped shift pattern, said shift pattern including a laterally extending neutral cross-over path having a central located neutral position;

a shift tower for operatively mounting said shifter lever with respect to the transmission, said shift tower defining a substantially spherical socket, said fulcrum ball being received in said socket for pivotal mounting with respect thereto; and first and second single leaf springs, said first single leaf flat spring biasing said first end of said rocking shaft and said second single leaf flat spring biasing said second end of said rocking shaft such that said first and second single leaf flat springs are on opposing sides of said shift lever and said first and second single leaf flat springs including an arcuate segment associated with said first and second end such that said first and second ends are matingly received in said arcuate segments.

19. The shifter assembly of claim 18, wherein said first and second single leaf flat springs cooperate to define a central recess for receiving said first and second ends of said rocking shaft, and further wherein said first and second single leaf flat springs exert a continuous downward force on said rocking shaft.

20. The shifter assembly of claim 19, wherein each single leaf flat spring is constructed from a fiber reinforced composite material.

* * * * *